A. H. Hook,
Polishing Plate Glass.
N° 24,908.  Patented July 26, 1859.
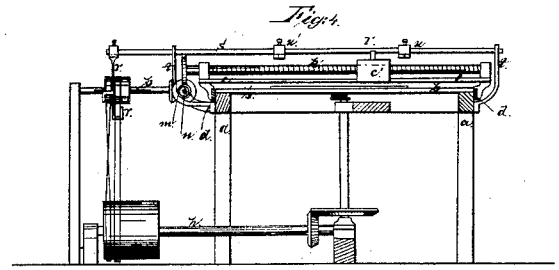
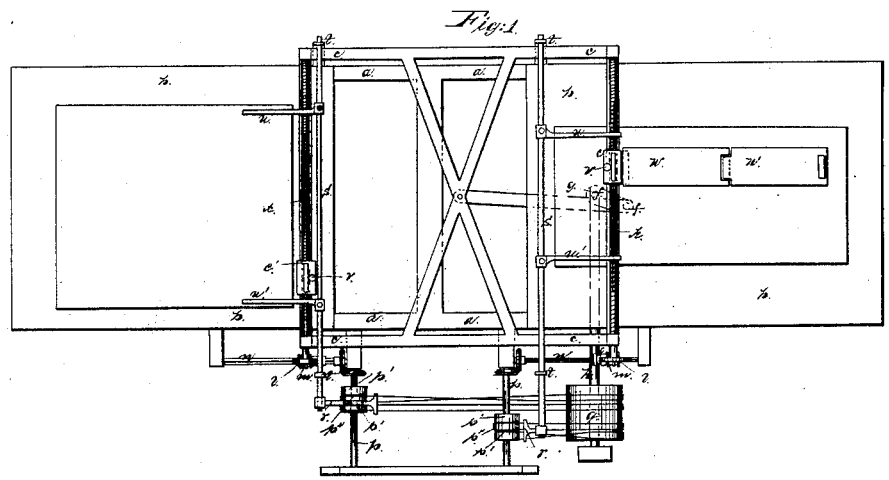
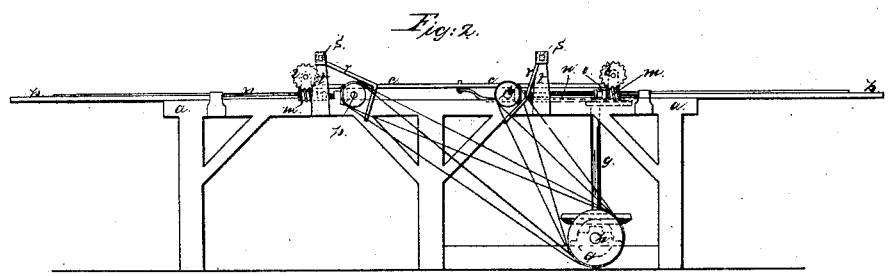
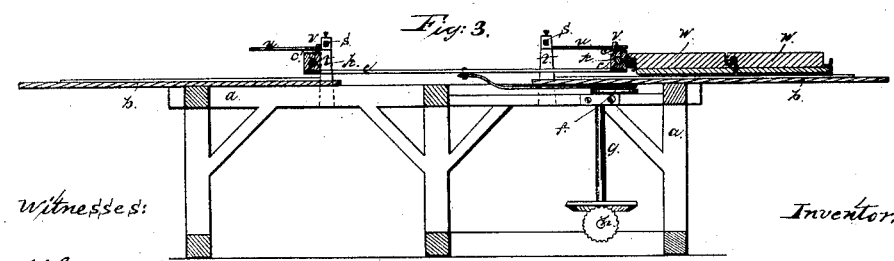
Witnesses:  Inventor:
Albert H. Hook

UNITED STATES PATENT OFFICE.

ALBERT H. HOOK, OF NEW YORK, N. Y., ASSIGNOR TO WILLIAM H. HORSTMANN, OF BROOKLYN, NEW YORK.

GLASS-POLISHING MACHINE.

Specification of Letters Patent No. 24,908, dated July 26, 1859.

*To all whom it may concern:*

Be it known that I, ALBERT H. HOOK, of the city, county, and State of New York, have invented a new and useful Machine for Polishing Plate-Glass; and I do hereby declare the following to be a full and clear description thereof, reference being had to the annexed drawings and to the letters of reference thereof.

In these drawings, Figure 1, represents a plan view of the whole machine. Fig. 2, a side elevation. Fig. 3, a longitudinal cut section. Fig. 4, a transverse cut section.

The nature of my invention consists in constructing a machine which gives to the polishing blocks a quick reciprocating motion produced by a crank, or other equivalent means, and a slow continuous transverse motion across the glass to be polished, which gradually changes the position of the polishing blocks at every stroke of the crank, so as to constantly expose new surface to said blocks: and when the blocks arrive at the edge of the glass, they reverse their motion and go across the glass again, until they arrive at the other edge, when they reverse again, and so on. This change of transverse motion is made self-acting altogether, and adjustable to any width of glass, that does not exceed the width of the table upon which it is placed.

Upon a strong suitable frame $a$, I fasten two tables $b$, one at each end, of any required length. Over these tables $b$, plays a carriage $c$, which travels upon iron rails $d$, arranged at the sides of the frame $a$. This carriage $c$, receives a reciprocating motion of about two or three feet, from a crank $f$, or other suitable device. This crank is fastened at the extreme end of an upright shaft $g$, and the shaft $g$, is driven by a horizontal shaft $h$, by means of bevel geared wheels. The ends of the carriage $c$, which move over and parallel to the tables $b$, form rails for blocks $c'$, which slide thereon from side to side, across the whole width of the tables, and receive their lateral motion from the screws $k$, which have their bearings at the corners of the carriage $c$. One end of each of these screws $k$, projects beyond the bearing, and receives a worm wheel $l$, on it, which gears into a worm $m$, that slides on a square shaft $n$, and turns with it. These square shafts $n$, must be parallel to the motion of the carriage $c$. The worm $m$, must follow the motion of the carriage $c$, so as to remain in gear with the worm wheel $l$. This is effected by forming in the hub of the worm $m$, a circular groove, and an arm $o$, fastened to the side of the carriage $c$, entering said groove, whereby the worm is at liberty to turn, and is guided from end to end of the square shaft. The two square shafts are geared into two other shafts $p$, both of which are parallel to the driving shaft $h$, and each of them is provided with two small pulleys $p'$, fastened to the shaft $p$, and a loose pulley $p''$, between them, and they are driven from a large pulley $q$, on the driving shaft $h$, by one straight and one crossed belt. These belts are guided by shippers $r$, which are arranged so as to hold the straight belt upon a fast pulley, and the crossed one upon the loose pulley, or the reverse, thereby reversing the motion of shafts $p$ and all the parts receiving their motion from them. The shippers $r$, are attached to the ends of two square bars $s$, which both extend across the tables over the carriage $c$, and rest in stationary bearings $t$, which are fastened to frame $a$. Each of said bars $s$, contains two adjustable gages $u$, and $u'$, which project out as long as the motion of the carriage $c$.

The blocks $c'$, are provided with round pins $v$, at their top, projecting up so high as to strike said gages $u$, when in their lateral motion they come up to said gages. When this takes place, the blocks $c'$, still following up their motion, will shift the bars $s$, and thereby shift the belts and reverse the motion of shaft $p$, square shaft $n$, screw $k$, and consequently the lateral motion of blocks $c'$, also. The polishing blocks $w$, which are made of heavy casting, with a wooden bottom faced with cloth, are hitched into blocks $c'$, in any convenient way, and a number of them can be hitched together, so as to form a row long enough to polish the whole length of the glass at once. They rest upon the glass with their whole weight and follow the reciprocal motion of the carriage $c$,—thereby polishing the glass, provided the usual polishing material is applied. The female screws in the blocks $c'$, can be removed so as to release the block from the screw either for the purpose of shifting it out on to a new spot, or allowing it to suspend its lateral motion at any point. When the screw is in action it gradually slides the blocks sidewise during the whole longitudinal motion, causing a compound motion very essential in perfectly polishing plate-glass, and continually causing the lines of motion to cross each other on each reversal of the lateral movement.

Having thus fully described my machine for polishing glass, what I claim therein is—

The combination of the apparatus for producing the reciprocating longitudinal motion and continuous lateral motion given to the polishing blocks, consisting of the screws $k$ worm wheel $l$ worm $m$ and its connections with the driving power arranged and operated in the manner set forth.

ALBERT H. HOOK.

Witnesses:
J. J. GREENOUGH,
JOHN BROWN.